United States Patent
Kamotsky (12) United States Patent (10) Patent No.: US 9,646,094 B2
(45) Date of Patent: *May 9, 2017

(54) SYSTEM AND METHOD FOR PERFORMING A MULTIPLE PASS SEARCH

(71) Applicant: MACY'S WEST STORES, INC., Cincinnati, OH (US)

(72) Inventor: Denis Kamotsky, San Francisco, CA (US)

(73) Assignee: Macy's West Stores, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/135,660

(22) Filed: Apr. 22, 2016

(65) Prior Publication Data

US 2016/0239548 A1    Aug. 18, 2016

Related U.S. Application Data

(63) Continuation of application No. 14/292,002, filed on May 30, 2014, now Pat. No. 9,449,098.

(51) Int. Cl.
*G06F 17/30* (2006.01)

(52) U.S. Cl.
CPC .. *G06F 17/30864* (2013.01); *G06F 17/30327* (2013.01); *G06F 17/30477* (2013.01); *G06F 17/30528* (2013.01); *G06F 17/30958* (2013.01)

(58) Field of Classification Search
None
See application file for complete search history.

(56) References Cited

U.S. PATENT DOCUMENTS

| | | | | |
|---|---|---|---|---|
| 5,822,747 A * | 10/1998 | Graefe | | G06F 17/30463 |
| 9,299,399 B2 * | 3/2016 | Lim | | G11C 7/1063 |
| 2003/0167272 A1 * | 9/2003 | Sinnott, Jr. | | G06F 17/30466 |
| 2004/0260685 A1 * | 12/2004 | Pfleiger | | G06F 17/30914 |
| 2006/0116999 A1 * | 6/2006 | Dettinger | | G06F 17/30398 |
| 2008/0154868 A1 * | 6/2008 | Ozcan | | G06F 17/30935 |
| 2010/0114885 A1 * | 5/2010 | Bowers | | G06F 17/30471 |
| | | | | 707/736 |
| 2011/0137890 A1 * | 6/2011 | Bestgen | | G06F 17/30466 |
| | | | | 707/719 |

(Continued)

*Primary Examiner* — Hung Le
(74) *Attorney, Agent, or Firm* — Amster, Rothstein & Ebenstein LLP (57) ABSTRACT

A method including the steps of: receiving a search query; executing a first search pass of a conditional search flow pipeline according to a first configuration; generating and storing information based on the executed first search pass as search context information; determining which search pass of the conditional search flow pipeline should be executed as a second search pass based on a transition rule associated with the first search pass and the search context information; executing the second search pass of the conditional search flow pipeline according to a second configuration; generating additional information based on the executed second search pass; updating the search context information based on the additional information; and determining whether to provide updated search context information or proceed to another search pass of the conditional search flow pipeline based on a transition rule associated with the second search pass and the updated search context information.

20 Claims, 6 Drawing Sheets

(56) References Cited

U.S. PATENT DOCUMENTS

| | | | |
|---|---|---|---|
| 2013/0073573 A1* | 3/2013 | Huang | G06F 17/30442 707/755 |
| 2013/0185276 A1* | 7/2013 | Rau | G06F 17/30864 707/707 |
| 2013/0297613 A1* | 11/2013 | Yu | G06F 17/30327 707/741 |

* cited by examiner

SYSTEM AND METHOD FOR PERFORMING A MULTIPLE PASS SEARCH

CROSS-REFERENCE TO RELATED APPLICATIONS

This application is a continuation of U.S. patent application Ser. No. 14/292,002, filed May 30, 2014.

FIELD OF THE INVENTION

The present invention generally relates to systems and methods for searching a database, and more particularly, the present invention relates to systems and methods for a search engine adaptable for an electronic commerce website to perform multiple context dependent search passes to generate search results.

SUMMARY OF THE INVENTION

Systems and methods for performing multiple context dependent search passes are provided.

A method according to an exemplary embodiment of the present invention comprises the steps of: receiving, using one or more processors, a search query containing search terms; executing, using one or more processors, a first search pass of a conditional search flow pipeline according to a first search pass configuration in response to the received search query; generating, using one or more processors, search results and associated information based on the executed first search pass; storing, using one or more processors, the search results and associated information obtained from the execution of the first search pass as search context information; determining, using one or more processors, which search pass of the conditional search flow pipeline should be executed as a second search pass based on a transition rule associated with the first search pass and the search context information; executing, using one or more processors, the second search pass of the conditional search flow pipeline according to a second search pass configuration in response to the received search query; generating, using one or more processors, additional search results and associated information based on the executed second search pass; updating, using one or more processors, the search context information based on the additional search results and associated information obtained from the execution of the second search pass; and determining, using one or more processors, whether to provide updated search results in the updated search context information or proceed to another search pass of the conditional search flow pipeline based on a transition rule associated with the second search pass and the updated search context information.

In an exemplary embodiment, the search context information comprises one or more implicit refinement constraints.

In an exemplary embodiment, the method further comprises the step of applying one or more implicit refinement constraints during execution of the first or second search pass.

In an exemplary embodiment, the step of updating the search context information is further based on the transition rule associated with the first search pass.

In an exemplary embodiment, the step of updating the search context information comprises storing the additional search results generated by the second search pass.

2

In an exemplary embodiment, the step of updating the search context information comprises discarding the search results generated by the first search pass.

A method according to an exemplary embodiment of the present invention comprises the steps of: receiving, using one or more processors, configuration parameters for one or more electronic search passes; receiving, using one or more processors, parameters related to transition rules for the one or more electronic search passes; storing, using one or more processors, the configuration parameters and the parameters related to the transition rules for the one or more electronic search passes in a configuration file; generating, using one or more processors, a conditional search flow pipeline from the configuration file to be executed by an electronic search engine module.

In an exemplary embodiment, the configuration parameters comprise indication of whether implicit refinements should be applied.

In an exemplary embodiment, the parameters related to a transition rule comprise identification of a transition path and one or more transition conditions associated with the transition path.

In an exemplary embodiment, the parameters related to a transition rule comprise indication of whether search results of an electronic search pass should be merged into or replaced by search results of another electronic search pass.

A system according to an exemplary embodiment of the present invention comprises: at least one processor; at least one non-transitory processor readable medium operatively connected to at least one processor, the at least one processor readable medium having processor readable instructions executable by the at least one processor to perform the following method: receiving, using one or more processors, a search query containing search terms; executing, using one or more processors, a first search pass of a conditional search flow pipeline according to a first search pass configuration in response to the received search query; generating, using one or more processors, search results and associated information based on the executed first search pass; storing, using one or more processors, the search results and associated information obtained from the execution of the first search pass as search context information; determining, using one or more processors, which search pass of the conditional search flow pipeline should be executed as a second search pass based on a transition rule associated with the first search pass and the search context information; executing, using one or more processors, the second search pass of the conditional search flow pipeline according to a second search pass configuration in response to the received search query; generating, using one or more processors, additional search results and associated information based on the executed second search pass; updating, using one or more processors, the search context information based on the additional search results and associated information obtained from the execution of the second search pass; and determining, using one or more processors, whether to provide updated search results in the updated search context information or proceed to another search pass of the conditional search flow pipeline based on a transition rule associated with the second search pass and the updated search context information.

A system according to an exemplary embodiment of the present invention comprises: at least one processor; at least one non-transitory processor readable medium operatively connected to at least one processor, the at least one processor readable medium having processor readable instructions executable by the at least one processor to perform the following method: receiving, using one or more processors, configuration parameters for one or more electronic search passes; receiving, using one or more processors, parameters related to transition rules for the one or more electronic search passes; storing, using one or more processors, the configuration parameters and the parameters related to the transition rules for the one or more electronic search passes in a configuration file; generating, using one or more processors, a conditional search flow pipeline from the configuration file to be executed by an electronic search engine module.

These and other features of this invention are described in, or are apparent from, the following detailed description of various exemplary embodiments of this invention.

BRIEF DESCRIPTION OF THE DRAWINGS

The features and advantages of the present invention will be more fully understood by reference to the following detailed description of illustrative embodiments of the present invention when taken in conjunction with the following figures, wherein.

DETAILED DESCRIPTION

In determining search results, such as search results for a keyword-based product search query on an electronic commerce website, it is important to produce search results that are comprehensive yet relevant to the query.

Typically, in a keyword-based product search query there exists a trade-off between precision (portion of products in the returned results that are relevant among all returned results) and recall (portion of relevant products returned among all relevant products in the database). Achieving 100% precision for every search result is impractical. On the other hand, achieving 100% recall is easily accomplished by returning the entire product catalog, but the precision of such a search result will be poor. Administrators for electronic commerce websites try to strike a balance by producing either highly precise search results with low recall (many relevant products are not returned) or imprecise search results with high recall (many non-relevant products are returned). The former approach may cause an online shopper to believe that the product is not available for sale on the merchant's electronic commerce website. The latter may result in a poor user experience for an online shopper because the online shopper may have to browse through irrelevant products to locate a desired product. The high recall approach may be mitigated by sorting the search results in the order of decreasing relevancy, however this still does not provide a satisfactory user experience. For example, on a website that provides faceted navigation of search results, an online shopper may be confused if a selectable facet feature contains an attribute value that is related to irrelevant products.

In general, it is difficult to configure a balanced search strategy using a single search pass because the search process is highly dependent on the keyword search terms that the online shopper uses. A multiple search pass approach would allow an electronic commerce website to attempt multiple search strategies in response to a single search query from an online shopper to optimize the precision and recall of the search results. Accordingly, various exemplary embodiments of the present invention are directed to systems and methods for implementing a search engine platform adaptable for an electronic commerce website, or other types of searchable electronic documents, that can perform multiple search passes using different search strategies in response to a single search query to obtain improved precision and recall of the search results that are returned to the online shopper, or other types of users. In at least one exemplary embodiment, a multiple pass search may comprise a sequence of search passes wherein the search strategy of the first search is very precise and the search strategy of each successive search pass in the sequence of search passes becomes progressively less precise. Moreover, in at least one exemplary embodiment, a multiple pass search may comprise a conditional sequence of search passes wherein the specific sequence flow of search passes in response to a search query is determined based on transitional rules and on the search results of one or more prior search passes.

The various exemplary embodiments of the present invention described herein may be implemented using one or more computer systems including one or more processors, one or more memory devices, one or more communication interfaces, and one or more persistent storage devices, including, one or more non-transitory computer readable media including computer-readable code containing instructions for the one or more processors to perform processing steps. The one or more computer systems may form part of a network, such as a local area network or a wide area network, such as, for example, the Internet. In exemplary embodiments, the one or more computer systems may include standard hardware components and/or specialized hardware components.

Figure 1:
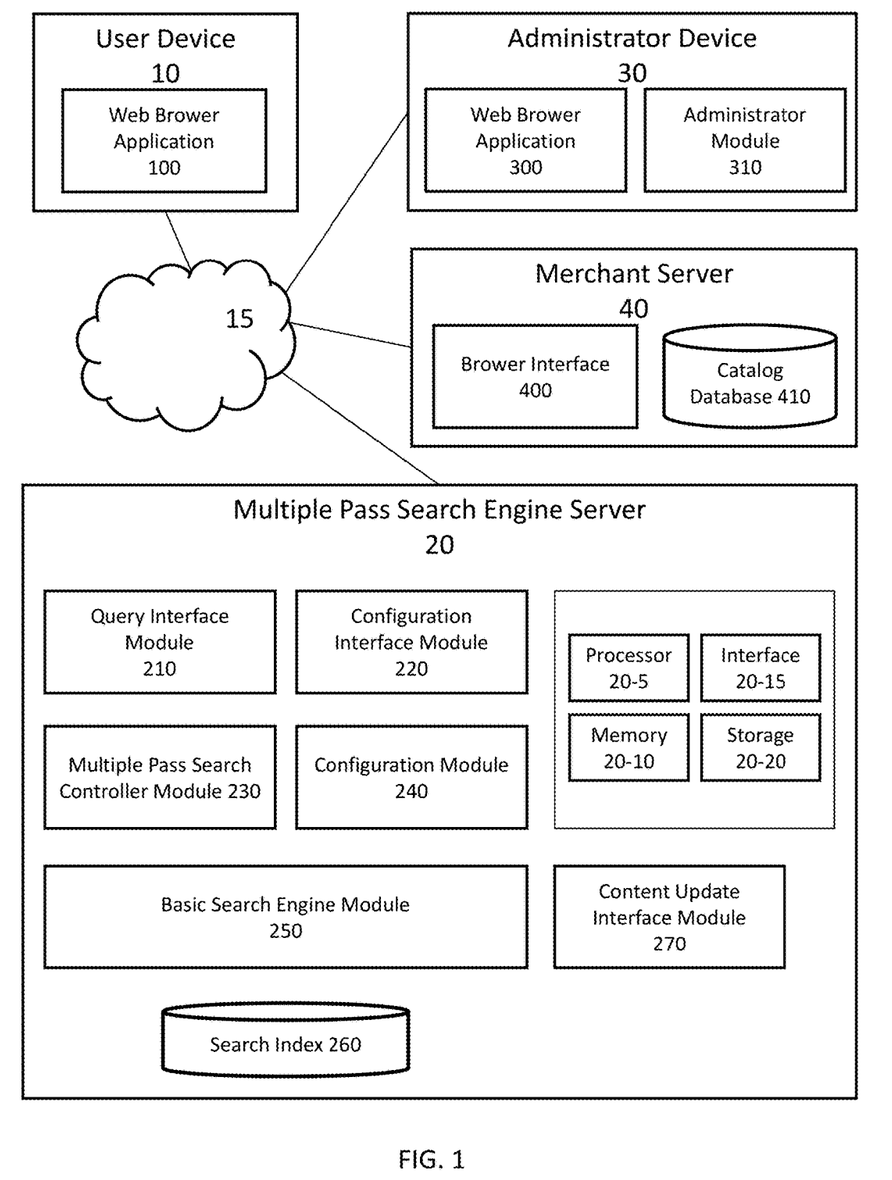
FIG. 1 is a schematic diagram of a multiple pass search engine server system in accordance with exemplary embodiments of the present invention.

The systems and methods of the present invention may be operated as part of a system for electronic commerce comprising one or more user devices that interact through a network with one or more merchant servers that offer goods for sale via a web page or electronic application. Referring to FIG. 1, search queries generated by online shoppers from one or more user devices 10, such as tablets, smartphones, or computers, connected through a network, such as the Internet 15, may be transmitted to one or more merchant servers 40 which, in turn may transmit the search query through the network to one or more multiple pass search engine servers 20. One or more administrator devices 30, connected through the network to one or more merchant servers or one or more multiple pass search engine servers, may be used for configuring such servers. In other embodiments, one or more of the functions of each of these devices and servers may be combined into a single server, and/or divided up among one or more other servers performing duplicate and/or portions of the functions.

Referring to FIG. 1, a multiple pass search engine server may contain a query interface module 210 to receive search queries and to transmit search results; a multiple pass search controller module 230 to manage a multiple pass search algorithm, and a basic search engine module 250 to execute a search using a particular search strategy and return results.

In exemplary embodiments, a basic search engine module 250 may be a full text search engine that facilitates searching using a searchable keyword index. An index may consist of one or more documents and a document may consist of one or more searchable fields. For example, in connection with an electronic commerce application, a document may correspond to a particular product sold by a merchant and each field of a document may correspond to a certain attribute of the product, e.g., brand, size, color, type, etc. that can be independently searched.

Each search executed by the basic search engine module 250 is referred to as a search pass. A multiple pass search is a plurality of individual search passes that are executed in sequence. The particular sequence of search passes in a multiple pass search may be dependent on the search results or search metadata of a search pass. Each search pass may terminate a search and return results or transition to one of one or more search passes. These conditional sequences of search passes, i.e., conditional search flows, result in a multiple pass search pipeline.

Figure 2:
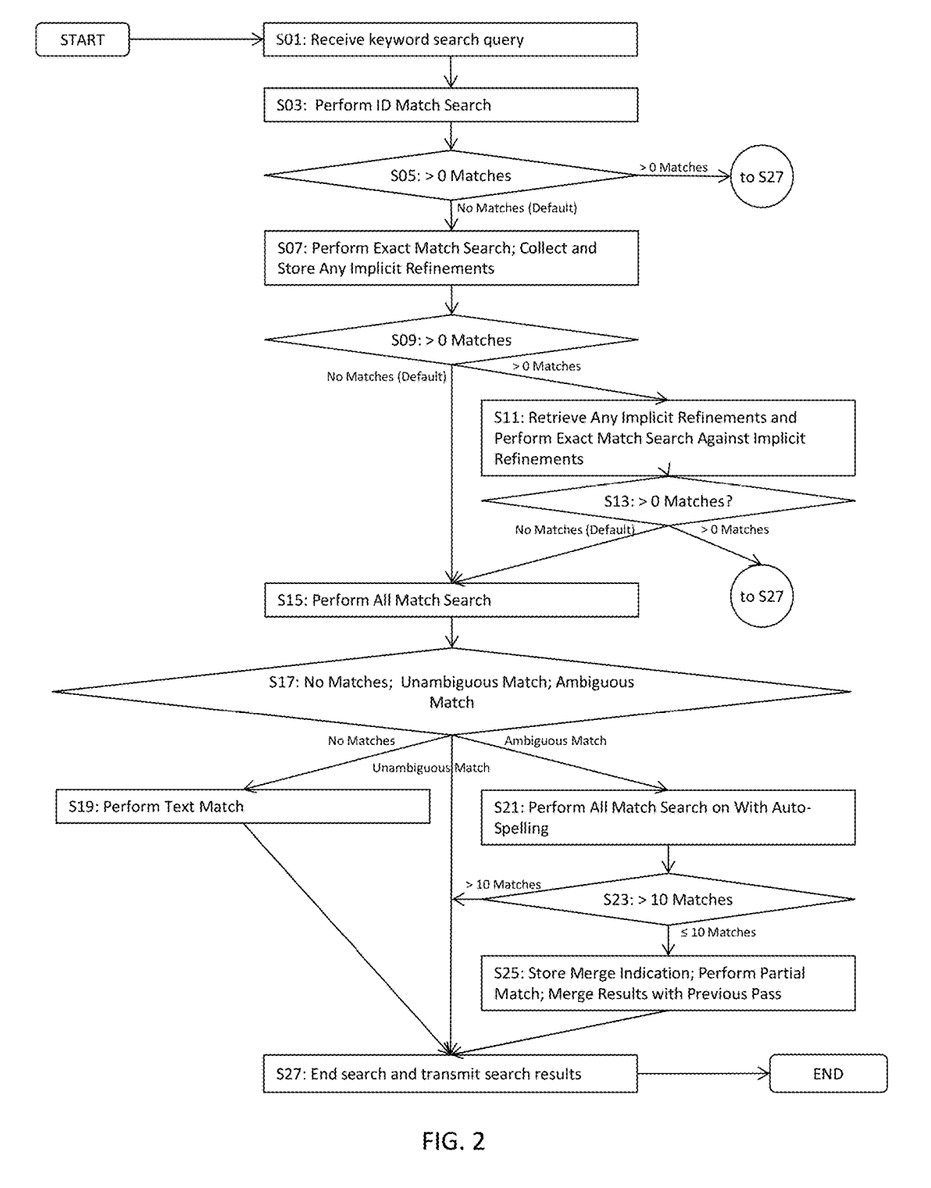
FIG. 2 is a flow chart of a process for a multiple pass search in accordance with exemplary embodiments of the present invention.

As shown in FIG. 2, according to an exemplary embodiment, a multiple pass search algorithm may be represented by a multiple pass search pipeline. The arrows indicate the possible transitions and the execution order of the search passes. The transitions between search passes in the multiple pass search sequence are governed by transition rules and conditions associated with each search pass. The transition rules define the possible transitions from the search pass and the threshold conditions for the transitions to occur.

Referring to FIG. 1, a multiple pass search controller module 230 interacts with the basic search engine module 250 to manage the execution of search passes. The multiple pass search controller module 230 initiates a search pass, examines the search results and/or search metadata (e.g., number of results, query length, etc.) in view of the corresponding transition rules and conditions and determines whether to terminate the search and return the search results or continue the search and determine to which search pass to transition. For example, a transition rule may require a minimum number of matches as a transition condition for a particular transition path. All or some of the search results and/or search metadata may be stored in memory and used in a subsequent search pass.

Figure 6:
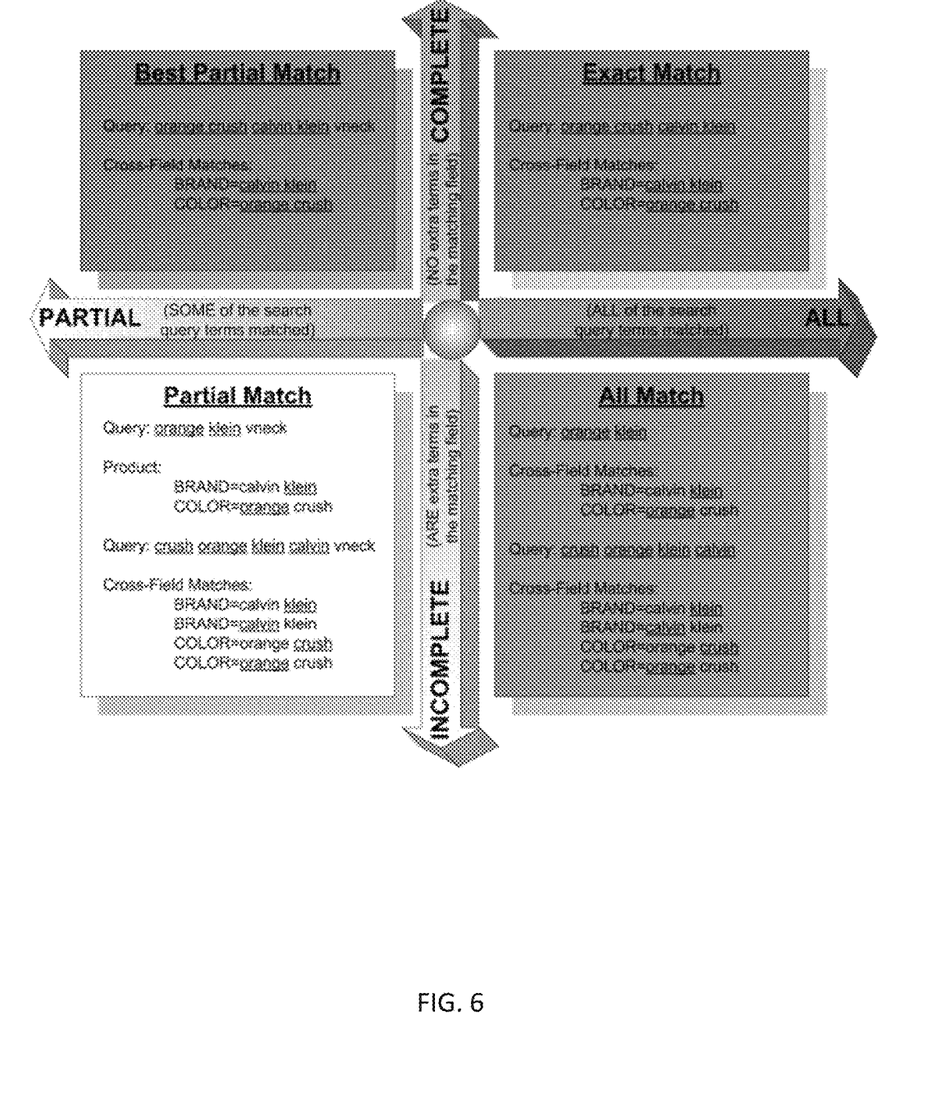
FIG. 6 is a chart showing different types of match strategies that can be implemented in a search pass, organized along two axes.

Each search pass may have its own search configuration associated with a particular search strategy. For example, each search pass may have its own search type (e.g., e.g., PATTERN search, as discussed in a co-pending patent application Ser. No. 14/292,018, the contents of which are incorporated herein by reference in their entirety, and match strategy as part of its search configuration. Referring to FIG. 6, there are several types of match strategies that can be implemented in a search pass, as organized along two axes in the illustration. The axes relate to where unmatched terms are allowed either in the query and/or in the document fields. Each quadrant defines a match strategy: exact match, all match, best partial match, and partial match. For an exact match, all query terms are matched and there are no extra terms in the matching field. For a partial match, some of the query terms are matched and there are extra terms in the matching field.

Specifically, FIG. 2 shows a high level flow chart illustrating a particular multiple pass search algorithm for handling a search query by a multiple pass search controller module 250. In step S01 of the method, a keyword search query is received. In step S03, a search pass for product identification numbers is performed. This includes determining whether the search query contains a product identification number or a universal product code (UPC) number in an acceptable format and, if so, performing a search only in the product identification number search field. In step S05, the transition rule associated with the search pass is applied. In particular, it is determined whether the transition condition of having at least one product identification number match is met. If the condition is met, the process proceeds to step S27, where the search results are transmitted and the process ends. Otherwise, the search flow transitions to the next search pass in step S07.

In step S07, a search pass for exact matches in a particular combination of fields associated with a product, such as brand, color, product type, gender, category, etc., is performed. For example, if the selected fields were brand, color, and product type and the query consisted of "blue", "calvin", "klein", and "jeans", only products having the following field values BRAND: "calvin klein", COLOR: "blue", and PRODUCT_TYPE: "jeans" without additional terms in those fields would be considered exactly matching. When there is a match in a particular field, the associated search parameter may be saved as an implicit refinement for another search pass. An implicit refinement is a specific value (or several values for a multi-valued field) of a specific field which matches a part of the search query and has at least one matching search result. For example, a search query "cute donna karan jeans" may imply two refinements: BRAND=DKNY and PRODUCT_TYPE=jeans.

In general, implicit refinements are implicit search constraints that may be determined from the search query and indexed field values and applied by the multiple pass search controller module 230 during execution of a search pass or they may be determined and collected by the multiple pass search controller 230 during execution of a search pass and saved for application in one or more subsequent search passes. Each search pass may generate one or more implicit refinements. The collection of implicit refinements is optional.

The collected implicit refinements may be stored as search context. A search context is data shared between multiple search passes, such as, search results, implicit refinements, list of actions taken (spelling autocorrect, cross-field matches, etc.) or other search metadata. Search context is stored by the multiple pass search controller module 230.

In step S09, the associated transition rule is applied. In particular, it is determined whether the transition condition of having at least one exact match is met. If the condition is met, the search flow transitions to the search pass in step S11, otherwise the search flow transitions to the alternative search pass in step S15.

In step S11, an exhaustive search pass searching all documents in the index for exact matches against all the implicit refinements collected in step S07 is invoked. In step S13, the associated transition rule is applied. In particular, it is determined whether the transition condition of having at least one document matching all implicit refinements is met. If there is at least one match the process proceeds to step S27, otherwise the search flow transitions to the next search pass in step S15.

In step S15, a search pass for matching all terms in the search query in any combination of fields is performed. In step S17, the associated transition rule is applied. According to the transition rule of step S17, there are three potential transitions each having its own transition condition that determines whether the flow path is used. The transition conditions are mutually exclusive because only one flow path may be selected. In at least one exemplary embodiment, the search flow path to be taken depends on the type of match. Specifically, it is determined whether there are no matches, all documents were matched the same way (unambiguous match), or there are multiple sets of implicit refinements, indicating that some documents were matched in ways different from some other documents. If there is an unambiguous match, the transition rule indicates that there is no further transition so the search ends and the results are returned. If there is an ambiguous match, the search flow transitions to the search pass in step S21. If there is no match, the search flow transitions to the search pass in step S19.

In step S19, a search pass involving a conventional tokenized text search for matching any query term in any order in any field is performed. The search ends and any results are returned because the associated transition rule indicates that there is no further search pass.

In step S21, a search pass for matching all search query terms in any field and with the automatic spelling correction filter enabled is performed. According to the associated transition rule in step S23, if there are more than 10 matches the search ends and the results are returned. If there are less than 10 matches, an indication to save the results for merging with the results of the next search pass is stored as search context information and the search flow transitions to the next search pass in step S25. In step S25, a search pass for partially matching any search query terms in any field is performed. Because the associated transition rule does not specify any additional transitions, the search ends and any results are merged with the results of the prior search pass and returned.

As shown in FIG. 2, the specific search flow may be dependent on the search query, the search results, search metadata, and the transition rules and conditions. In exemplary embodiments, the scope of each search pass may broaden with each successive search pass until a threshold number of relevant search results are found. For example, in the exemplary multiple pass search algorithm shown in FIG. 2, the first search pass is limited to product identification numbers, the next two searches are limited to exact matches, and the subsequent search allows extra unmatched terms in the field.

Figure 3:
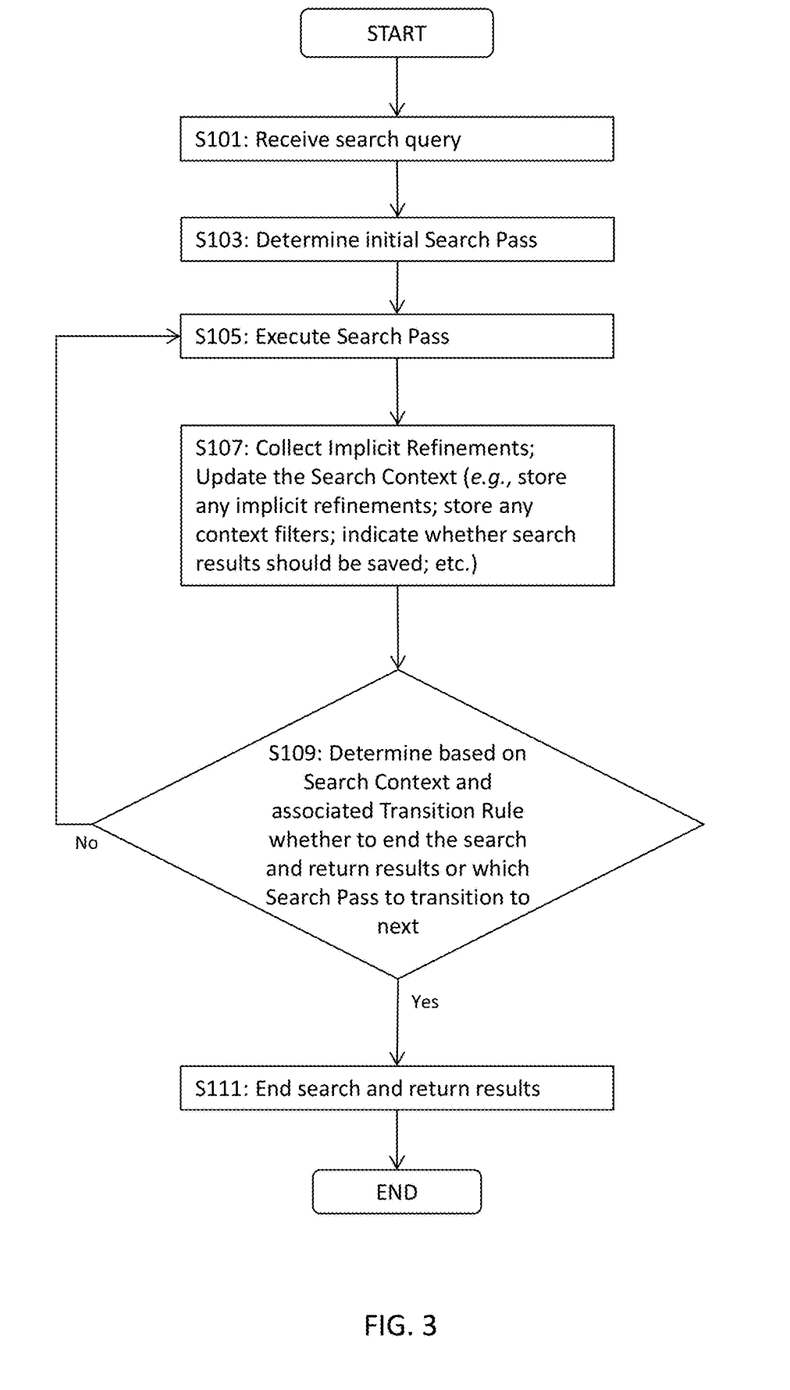
FIG. 3 is a flow chart of a process for a general multiple pass search in accordance with exemplary embodiments of the present invention.

Referring to FIG. 3, a flow chart of a general multiple pass search algorithm for a multiple pass search controller module is illustrated. In step S101, the multiple pass search controller module receives a search query. In step S103, the multiple pass search controller module determines which search pass to attempt first. In at least one exemplary embodiment, the multiple pass search controller module may refer to a configuration file. Additionally, in at least one exemplary embodiment, the first search pass may be the same for all queries.

In step S105, the multiple pass search controller module 230 interfaces with the basic search engine module 250 to execute the search pass. In at least one exemplary embodiment, the interface is an API that permits the multiple pass search controller module 230 to make search requests and pass parameters to the basic search engine module 250. Other interfaces, such as the conventional HTTP internet interface may be used.

In step S107, the multiple pass search controller module 230 may determine whether the current search results should be discarded or saved and/or merged with the results of another search pass. The search context is updated to indicate any actions that may be performed on the search results, e.g., whether results should be saved to be merged with the results of the subsequent search pass. Further, the multiple search pass controller module 230 may detect and apply implicit refinements to the search results or collect and store implicit refinements in the search context for subsequent use. Additionally, the multiple search pass controller module 230 may determine context information from a received search query and use that information to help filter the search results. For example, the geographic location of the online shopper can be determined based on the Internet Protocol address from which the search query originated and this information may be used to limit the search results to products available for shipping to the identified geographic location. In general, such context filters, are implicit search constraints that may be determined from the search meta data and applied by the multiple pass search controller module 230 to filter search results of a search pass.

In step 109, the multiple pass search controller module may use information stored in the search context, the results returned from the basic search engine module 250, and the transition rule and conditions associated with the search pass to determine whether to end the search and return the results or which search pass to transition to next.

Preferably, the multiple pass search flow pipeline is configurable, i.e., the search passes can be configured and/or searches passes may be added or removed to form different combinations of search flows. In at least one exemplary embodiment, the logical structure of the multiple pass search algorithm may be defined in a configuration file, such as, for example an XML file. For example, the administrator may instruct the program to reread a configuration file once it is created or modified and apply changes to the current search process. This allows the search algorithm to be modified or a new algorithm to be created without the need to rewrite the program code. The configuration file may define one or more search flows each including a sequence of one or more search passes, including the rules and conditions governing the transition from one search pass to another. The configuration file may also define the search configuration for each individual search pass.

Figure 4:
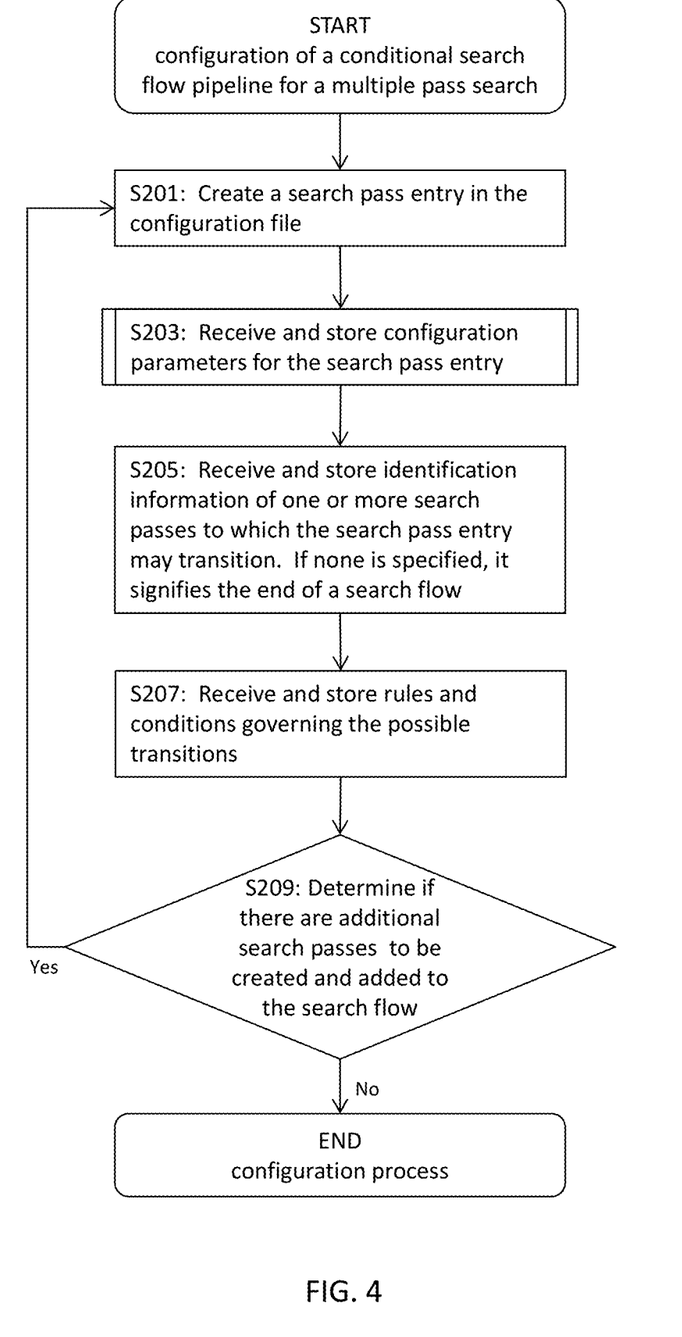
FIG. 4 is a flow chart of a process for configuring a multiple pass search in accordance with exemplary embodiments of the present invention.
Figure 5:
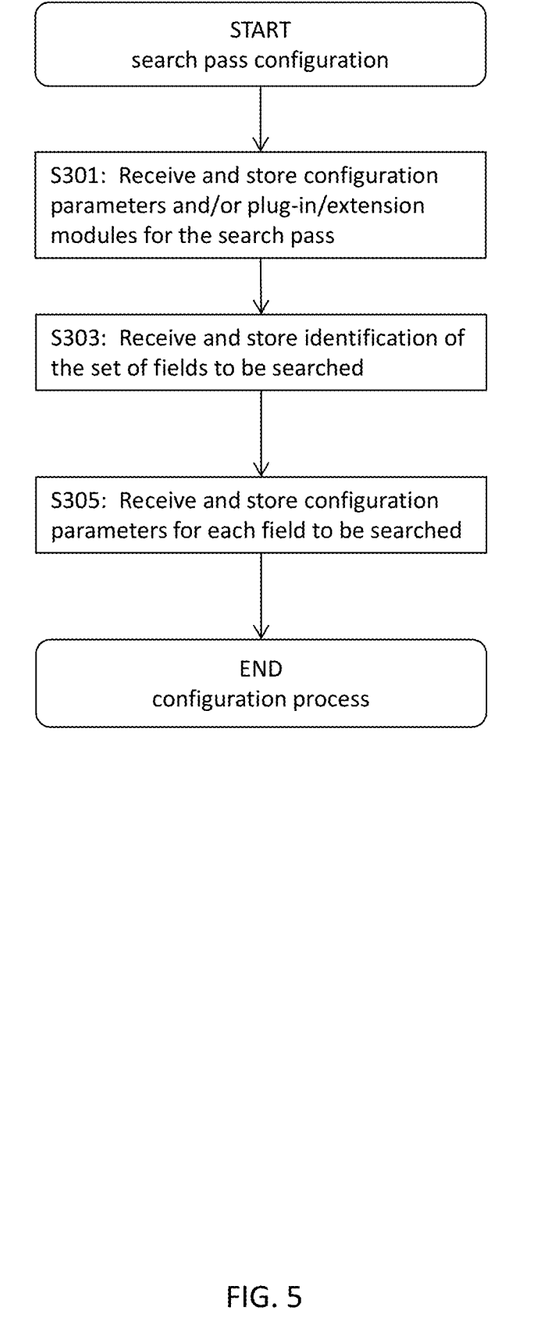
FIG. 5 is a flow chart of a process for configuring a search pass of a multiple pass search in accordance with exemplary embodiments of the present invention.

Referring again to FIG. 1, a configuration module 240 may execute the method illustrated in FIG. 4 to configure a conditional search flow pipeline representing a multiple pass search algorithm. The configuration information may be received from a configuration interface module 220 connected through a network, such as Internet 15, to an administrator device 30 via a web browser application interface or a proprietary user interface. The configuration information may include: configuration parameters for a search pass (e.g., search strategy), indication of the subsequent search passes to which the current search pass may transition, and the associated transition rules and conditions for each potential transition. FIG. 4 shows an overview of how a conditional search flow pipeline may be created or modified using a configuration file. Particularly, FIG. 4 shows how a search pass can be added to a conditional search flow pipeline. In step S201, a new search pass entry is added as a new entry in a configuration file. In step S203, configuration parameters for the search pass entry are received and stored in the corresponding entry in the configuration file. FIG. 5 shows this step in greater detail. In step S205, indication of the one or more search passes to which the search pass entry may transition is stored. If none are indicated, the parameter in the configuration file is left blank. This signifies that the search pass entry is the last search pass in a search flow and results should be returned. In step S207, for each transition path specified in step S205, the transition conditions associated with the particular transition are stored respectively. In particular, transition conditions may include meeting a threshold number of search results, whether implicit refinements have been applied, whether a particular type of match is satisfied, etc. Multiple transition conditions may be specified for a particular transition. When multiple transition conditions are specified, all transition conditions must be satisfied for the transition to occur. A transition rule may also determine whether search results should be returned to the online shopper, whether current search results should be discarded and another search should be attempted, or whether current search results should be merged with results of the next search pass.

At step S209, steps S201 through S207 of the process are repeated until configuration information for each search pass in the conditional search flow pipeline of a multiple search pass algorithm is stored in the configuration file.

Referring to FIG. 5, in exemplary embodiments, each search pass may be configured. FIG. 5 shows an overview of how a search strategy of a search pass may be configured. In step S301, general configuration parameters for a search pass are received and stored in the configuration file. In particular, general configuration parameters for a search pass may include, for example, the search type, match type, maximum query length, minimum number of fields that must be matched, etc. Additionally, plug-in and/or extension modules for a search pass may also be received through the configuration interface module 220 and stored in the configuration module 240 if the basic search engine module 250 supports plugin architecture. For example, an administrator may provide different normalization algorithms to be used in addition or instead of the default normalization algorithms (e.g., stemming, spelling correction). Normalization algorithms include filters that may be applied to text to generate a standard set of index/query terms for purposes of index/query building by the search engine. In step S303, identification of the set of fields that must be searched are received and stored. In step S305, parameters specific to each field identified in step S303, are received and stored. In particular, field specific configuration parameters may include, for example, match type, ordered list of normalization algorithms, relevancy boost, etc.

Table 1 shows an exemplary list of the general and field specific search parameters that may be part of a configuration file.

| | Description |
|---|---|
| General Search Parameters | |
| field set | set of designated fields |
| search_type | e.g., pattern search or text search |
| maxWords | maximum input query length |
| maxOmitWords | maximum number of unmatched words in the search query |
| minFieldsMatch | minimum number of fields from the field set which must be matched |
| maxFieldsMatch | maximum number of fields from the field set which must be matched |
| multiMatch | boolean parameter that controls whether a field may be matched several times to different parts of the query |
| refineByImplicit | instructs application of Implicit Refinements accumulated so far by the previous search passes in the search context as additional filters to the search query |
| Field Specific Parameters | |
| match_type | e.g., COMPLETE: requires that there is a complete match between a phrase from the query partition and a field value; INCOMPLETE: requires that the field value contains the phrase from the query partition, but allows the field value to have unmatched terms; |
| match_strategy | e.g., defines a specific INCOMPLETE match_type algorithm for a particular field |
| must_match | e.g., boolean parameter that controls whether a particular field must be matched |
| collectRefinements | e.g., boolean parameter that controls whether implicit refinements should be collected for a particular field |
| stemming_mode | e.g., NONE; disables stemming; DEFAULT: applies the system wide stemming algorithm to the particular field |
| spellingAccuracy | e.g., integer percentage value indicating sensitivity of spell correction for the particular field |

By using the configuration parameters to create different search strategies for each search pass, administrators of an electronic commerce website can implement a multiple pass search that begins with the order of decreasing precision, i.e., if the recall of a high precision search pass is satisfactory based on certain metrics configured by the administrator, the result is returned to the customer. If the recall of a high precision search pass is not satisfactory, subsequent passes each successively lower in precision are attempted.

Preferably, the multiple pass search engine platform employs a modular design to take advantage of available third party software. In at least one exemplary embodiment, as shown in FIG. 1, the multiple pass search controller module 230 is implemented as web application module that interacts with a typical search platform, for example, such as Solr/Lucene, Endeca, etc., which are standalone full text search servers. A general full text search server performs a single search pass with configurable steps, such as linguistic analyzers, matching strategies, ranking strategies, etc.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:
1. A method comprising the steps of:
receiving, using one or more processors, a search query containing search terms;
executing, using one or more processors, a first search pass of a conditional search flow pipeline according to a first search pass configuration in response to the received search query, said conditional search flow pipeline comprising a plurality of predefined search passes arranged in a hierarchical structure wherein a predefined search pass can be configured to transition to one of a plurality of predefined search passes, wherein each predefined search pass comprises a different search methodology and set of search constraints;

generating, using one or more processors, search results and associated information based on the executed first search pass;

storing, using one or more processors, the search results and associated information obtained from the execution of the first search pass as search context information;

determining, using one or more processors, which search pass of the conditional search flow pipeline should be executed as a second search pass based on a transition rule associated with the first search pass and the search context information;

executing, using one or more processors, the second search pass of the conditional search flow pipeline according to a second search pass configuration in response to the received search query;

generating, using one or more processors, additional search results and associated information based on the executed second search pass;

updating, using one or more processors, the search context information based on the additional search results and associated information obtained from the execution of the second search pass; and determining, using one or more processors, whether to provide updated search results in the updated search context information or proceed to another search pass of the conditional search flow pipeline based on a transition rule associated with the second search pass and the updated search context information.

2. The method of claim 1, wherein the search context information comprises one or more implicit refinement constraints.

3. The method of claim 2, further comprising the step of applying one or more implicit refinement constraints during execution of the first or second search pass.

4. The method of claim 1, wherein the step of updating the search context information is further based on the transition rule associated with the first search pass.

5. The method of claim 1, wherein the step of updating the search context information comprises storing the additional search results generated by the second search pass.

6. The method of claim 5, wherein the step of updating the search context information comprises discarding the search results generated by the first search pass.

7. The method of claim 1, wherein the hierarchical structure is a branching tree structure.

8. The method of claim 1, wherein the hierarchical structure is a directed acyclic graph.

9. A method comprising the steps of:

receiving, using one or more processors, configuration parameters for multiple electronic search passes;

receiving, using one or more processors, parameters related to transition rules for the multiple electronic search passes;

storing, using one or more processors, the configuration parameters and the parameters related to the transition rules for the multiple electronic search passes in a configuration file;

generating, using one or more processors, a conditional search flow pipeline from the configuration file to be executed by an electronic search engine module, said conditional search flow pipeline comprising a plurality of predefined electronic search passes arranged in a hierarchical structure wherein a predefined electronic search pass can be configured to transition to one of a plurality of predefined electronic search passes, wherein each predefined electronic search pass comprises a different search methodology and set of search constraints.

10. The method of claim 9, wherein the configuration parameters comprise indication of whether implicit refinements should be applied.

11. A system comprising:

at least one processor;

at least one non-transitory processor readable medium operatively connected to at least one processor, the at least one processor readable medium having processor readable instructions executable by the at least one processor to perform the following method:

receiving, using one or more processors, a search query containing search terms;

executing, using one or more processors, a first search pass of a conditional search flow pipeline according to a first search pass configuration in response to the received search query, said conditional search flow pipeline comprising a plurality of predefined search passes arranged in a hierarchical structure wherein a predefined search pass can be configured to transition to one of a plurality of predefined search passes, wherein each predefined search pass comprises a different search methodology and set of search constraints;

generating, using one or more processors, search results and associated information based on the executed first search pass;

storing, using one or more processors, the search results and associated information obtained from the execution of the first search pass as search context information;

determining, using one or more processors, which search pass of the conditional search flow pipeline should be executed as a second search pass based on a transition rule associated with the first search pass and the search context information;

executing, using one or more processors, the second search pass of the conditional search flow pipeline according to a second search pass configuration in response to the received search query;

generating, using one or more processors, additional search results and associated information based on the executed second search pass;

updating, using one or more processors, the search context information based on the additional search results and associated information obtained from the execution of the second search pass; and determining, using one or more processors, whether to provide updated search results in the updated search context information or proceed to another search pass of the conditional search flow pipeline based on a transition rule associated with the second search pass and the updated search context information.

12. The system of claim 11, wherein the search context information comprises one or more implicit refinement constraints.

13. The system of claim 12, wherein the at least one processor further performs the step of applying one or more implicit refinement constraints during execution of the first or second search pass.

14. The system of claim 11, wherein the step of updating the search context information is further based on the transition rule associated with the first search pass.

15. The system of claim 11, wherein the step of updating the search context information comprises storing the additional search results generated by the second search pass.

16. The system of claim 15, wherein the step of updating the search context information comprises discarding the search results generated by the first search pass.

17. The method of claim 1, wherein the hierarchical structure is a branching tree structure.

18. The method of claim 1, wherein the hierarchical structure is a directed acyclic graph.

19. A system comprising:
- at least one processor;
- at least one non-transitory processor readable medium operatively connected to at least one processor, the at least one processor readable medium having processor readable instructions executable by the at least one processor to perform the following method:
- receiving, using one or more processors, configuration parameters for multiple electronic search passes;
- receiving, using one or more processors, parameters related to transition rules for the multiple electronic search passes;
- storing, using one or more processors, the configuration parameters and the parameters related to the transition rules for the multiple electronic search passes in a configuration file;
- generating, using one or more processors, a conditional search flow pipeline from the configuration file to be executed by an electronic search engine module, said conditional search flow pipeline comprising a plurality of predefined electronic search passes arranged in a hierarchical structure wherein a predefined electronic search pass can be configured to transition to one of a plurality of predefined electronic search passes, wherein each predefined electronic search pass comprises a different search methodology and set of search constraints.

20. The system of claim 19, wherein the configuration parameters comprise indication of whether implicit refinements should be applied.

* * * * *

UNITED STATES PATENT AND TRADEMARK OFFICE
CERTIFICATE OF CORRECTION

PATENT NO. : 9,646,094 B2  
APPLICATION NO. : 15/135660  
DATED : May 9, 2017  
INVENTOR(S) : Denis Kamotsky Page 1 of 1

It is certified that error appears in the above-identified patent and that said Letters Patent is hereby corrected as shown below:

In the Claims

In Claim 17, Line 7, delete "The method of claim 1" and insert --The method of claim 11--.

In Claim 18, Line 9, delete "The method of claim 1" and insert --The method of claim 11--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*